UNITED STATES PATENT OFFICE 2,128,823

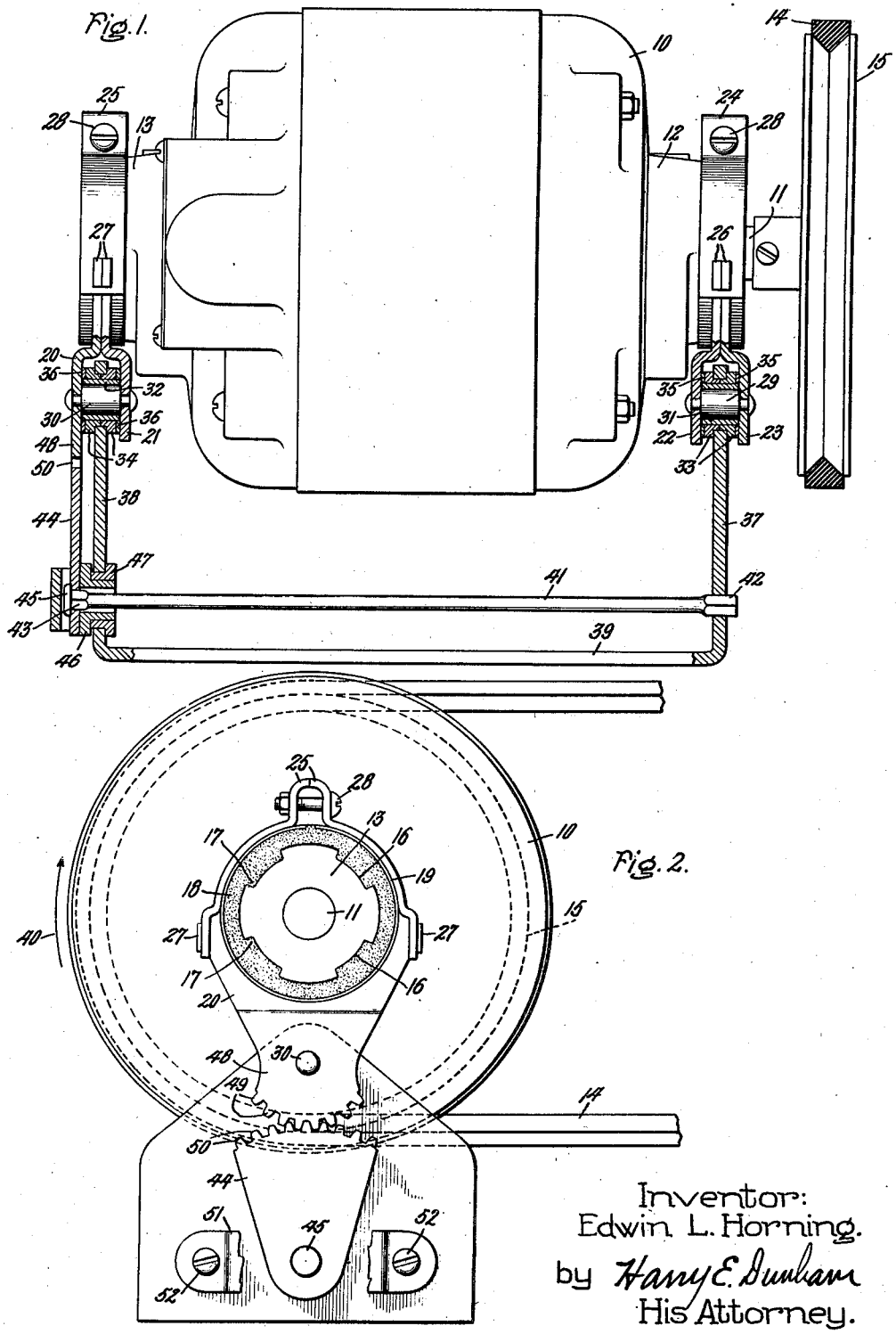

MOUNTING FOR DYNAMO-ELECTRIC MACHINES

Edwin L. Horning, Fort Wayne, Ind., assignor to General Electric Company, a corporation of New York Application May 28, 1936, Serial No. 82,303

10 Claims. (Cl. 248—23)

My invention relates to mountings for dynamo-electric machines.

It is often found desirable in dynamo-electric machines to utilize a driving connection which will permit slippage to prevent injury to the dynamo-electric machine under abnormal load conditions, such as occur in starting or during overloads. Friction pulleys and belt drives are often used for such connections and the torque, which can be transmitted through such drives, is a direct function of the friction between the driving contact surfaces. It is generally desirable that a certain amount of slippage should occur in the driving connection when starting and various arrangements have been devised for biasing the driving or driven members for varying the contact friction under these conditions.

An object of my invention is to provide a dynamo-electric machine or the like with a frictional driving connection having an improved and simplified arrangement for adjusting the friction in the driving connection.

Further objects and advantages of my invention will become apparent and my invention will be better understood from the following description referring to the accompanying drawing, and the features of novelty which characterize my invention will be pointed out with particularity in the claims annexed to and forming a part of this specification.

For a better understanding of my invention, reference is made to the accompanying drawing wherein Fig. 1 is a side elevation partly in section of a dynamo-electric machine provided with a mounting embodying my invention, and Fig. 2 is an end elevation of the support and motor illustrated in Fig. 1 viewed from the end opposite the pulley.

Referring to the drawing, I have shown a dynamo-electric machine having a stationary member 10 and a rotatable member mounted therein on a shaft 11, the ends of which are journaled in hubs 12 and 13. Power is transmitted from the dynamo-electric machine to a driven machine through a flexible frictional driving connection comprising a V-belt 14 which engages a V-groove pulley 15 mounted upon the shaft 11.

This dynamo-electric machine is resiliently supported by providing axial grooves 16 in the surface of the hubs 12 and 13 which are engaged by complementary projections 17 on the inner surface of two resilient supporting annuluses 18 which may be made of rubber or the like. The resilient annuluses 18 are provided with metal bands 19 which are bonded thereto, this assembly being supported in the arcuate ends of sheet metal supporting members 20, 21, 22, and 23, and are secured therein by clamps 24 and 25 at opposite ends of the machine. The lower ends of the clamps 24 and 25 are provided with slots fitted on projections 26 and 27, respectively, on the ends of the supporting members, the upper ends of the clamps 24 and 25 being secured together by bolts 28.

This resilient clamped supporting arrangement is not my invention, but is the invention of Alfred F. Welch and is described and claimed in his copending application, Serial No. 727,432, filed May 25, 1934, now Patent No. 2,074,136 of March 16, 1937, and assigned to the General Electric Company, assignee of this application.

The stationary member 10 of the dynamo-electric machine is pivotally supported eccentrically with respect to the axis of the shaft 11, that is, eccentric to the axis of the rotatable member. This pivotal support comprises pins 29 and 30 pivotally connecting the supporting members to a U-shaped mounting base 39 and are supported in bearings 31 and 32 arranged in bushings 33 and 34 fitted between washers 35 and 36 and retained in openings in the upright arms 37 and 38, respectively, of the mounting base 39. This arrangement provides a resilient pivotal mounting for the dynamo-electric machine.

During normal operation of the dynamo-electric machine, this resilient supporting arrangement utilizes a displacing force exerted by the belt 14 of the dynamo-electric machine to tension the belt in accordance with the load transmitted. In order to fully utilize the effect of this displacing force for increasing the frictional driving connection, the pivotal axis of the stationary member of the motor through the pins 29 and 30 is parallel to and eccentric with respect to the axis of rotation of the rotatable member of the dynamo-electric machine carried on the shaft 11, and is located at a smaller distance from this axis of the rotatable member than the radius of the driving pulley 15. The driving friction is increased by tightening of the belt 14 when the motor rotates in a clockwise direction as viewed in Fig. 2, and indicated by the arrow 40. Under these conditions, the lower side of the belt 14 will be the tight side and the upper side will be the loose side of the belt. In order to obtain a tightening of the belt, it is, therefore, necessary that the torque about the pivotal axis resulting from the displacing force exerted on the machine by the tight side of the belt be greater than the torque about this axis resulting from the displacing force exerted on the machine by the loose side of the belt. A consideration of these displacing forces in relation to the pivotal axis will indicate that the location of the pivotal axis should be at a lesser distance from the rotational axis of the rotatable member than the radius of the pulley and eccentric with respect to this rotational axis on the driving side of the frictional connection which, in the illustrated embodiment of my invention, is the tight belt side of the pulley. This eccentric arrangement of the pivotal support for the dynamo-electric machine and the particular relation of the pivot to the sides of the belt is not my invention, but is the invention of Wilbur W. Warner and is described and claimed in his copending application, Serial No. 753,112, filed November 15, 1934, now Patent No. 2,074,135 of March 16, 1937, and assigned to the General Electric Company, assignee of this application.

With such a pivotal mounting of the dynamo-electric machine, it becomes necessary to provide for maintaining the driving pulley 15 in contact with the belt 14 when the machine is at rest, so that there will be sufficient friction between the pulley and the belt to start the load. It is desirable under such conditions that a certain amount of slippage occur in the frictional driving connection upon excessive load in order to prevent overloading of the machine. I obtain this necessary starting friction by biasing the machine and its pulley 15 into engagement with the belt loop by a resilient biasing member. In the illustrated embodiment of my invention, I prefer to utilize the torsional resistance of a spring rod 41 for biasing the pulley 15 into engagement with the belt loop by swinging the machine about the pivotal axis through the pins 29 and 30. The rod 41 is secured at one end against turning with respect to the mounting base by a square head 42 engaging a square opening in the upright arm 37 of the mounting base. The other end of the rod 41 is provided with a square head 43 engaging a corresponding square opening in a sheet metal segmental gear 44 and is provided with an enlarged head 45 in order to prevent the longitudinal displacement of the rod 41 from its engagement with the opening in the segmental gear. The segmental gear 44 is provided with a hub 46 attached thereto and arranged about the rod 41. This hub is rotatably mounted in a bushing 47 arranged in an opening in the upright arm 38 of the mounting base. The supporting member 20 is provided with an extension on which is formed a segmental gear 48 having teeth 49 arranged to mesh with teeth 50 of the segmental gear 44. A retaining plate 51 is secured by screws 52 to the upright arm 38 of the mounting base and is arranged to prevent longitudinal displacement of the torsion rod from its connections with the mounting base and the segmental gear. The turning of the segmental gear 44 and the rod 41 is limited by the sides of the arms 37 and 38, which act as stops in the path of movement of the supporting members 20 and 21, and 22 and 23 respectively.

The desired starting friction between the belt 14 and the pulley 15 may be regulated by adjustment of the torsional strain in the rod 41. This adjustment is obtained by changing the meshing relation of the teeth 50 of the segmental gear 44 with the teeth 49 of the segmental gear 48. This provides an adjustable torsional connection between the spring rod 41 and the dynamo-electric machine mounting and provides an arrangement for adjusting the starting friction of the driving connection by varying the torsional resistance of the rod 41 without bending of the rods. The initial torsion of the rod 41 is adjusted by removing the guard plate 51 and pulling out the rod 41 and the segmental gear 44 a small distance sufficient to disengage the teeth 50 from the teeth 49 and yet retain the engagement of the square head 42 with the square opening in the upright arm 37 of the mounting base. The initial torsion is then obtained by twisting the rod 41 and then sliding it longitudinally back into place such that the teeth 50 of the segmental gear 44 reengage the teeth 49 of the segmental gear 48. The guard plate 51 is then replaced and secured to the upright arm 38 of the mounting base. The torsional strain thus set up in the rod produces a torsional spring effect which is transmitted to the motor frame 10 through the segmental gears and the supporting member 20. The angular movement or twist of the torsion rod may also be varied by changing the ratio of the radius of the segmental gear 44 to the radius of the segmental gear 48.

By proper adjustment of the torsion of the spring rod 41, the friction between the pulley 15 and the belt 14 may be regulated, so that a certain amount of slippage of the belt will occur and the dynamo-electric machine will start under a light load and, hence, will not draw a harmful or excessive current. Having thus started, the resultant torque, due to the relative tensions in the tight and loose sides of the belt, will cause the stationary member 10 of the dynamo-electric machine to pivot about an axis passing through the pivot pins 29 and 30 into the loop of the belt. As described above, the friction between the pulley 15 and the belt 14 will vary in accordance with the load transmitted by the frictional driving connection, and the minimum friction between the belt 14 and the pulley 15 is determined by the initially biased position of the dynamo-electric machine produced by the spring action of the torsion rod 41.

While I have illustrated and described one embodiment of my invention, modifications thereof will occur to those skilled in the art. I desire it to be understood, therefore, that my invention is not to be limited to the particular arrangement disclosed and I intend, in the appended claims, to cover all modifications which do not depart from the spirit and scope of my invention.

What I claim as new and desire to secure by Letters Patent in the United States is:

1. A dynamo-electric machine or the like having a stationary member and a rotatable member provided with a frictional driving connection, a mounting base, means for pivotally supporting said stationary member on said mounting base, a torsion spring rod, means for securing one end of said torsion spring rod to said mounting base and against turning movement with respect to said mounting base, and means including a segmental gear rockably mounted on said mounting base and arranged to cooperate with said pivotal supporting means for biasing said stationary member with respect to said driving connection, the other end of said torsion spring rod being received by said segmental gear in non-rotatable relation thereto.

2. A dynamo-electric machine or the like having a stationary member and a rotatable member provided with a frictional driving connection adapted to exert a displacing force on said machine, a mounting base, means for pivotally supporting said stationary member on said mounting base, a segmental gear, a second segmental gear arranged to cooperate with said first mentioned segmental gear, and means connected through said segmental gears to said pivotal supporting means for resiliently biasing said stationary member with respect to said driving connection.

3. A dynamo-electric machine or the like having a stationary member and a rotatable member provided with a frictional driving connection adapted to exert a displacing force on said machine, a mounting base, means for pivotally supporting said stationary member on said mounting base, a torsion spring rod, means for securing one end of said torsion spring rod to said mounting base against turning movement with respect to said mounting base, a segmental gear associated with said pivotal supporting means, and means securing the other end of said torsion spring rod for limited turning movement with respect to said mounting base including a second segmental gear arranged to cooperate with said first mentioned segmental gear for biasing said stationary member with respect to said driving connection.

4. A dynamo-electric machine or the like including a stationary member and a rotatable member provided with a frictional driving connection adapted to exert a displacing force on said machine, means including pivotal supports for said stationary member eccentric with respect to the rotational axis of said rotatable member and utilizing said driving connection displacing force for varying the driving friction in said driving connection, a mounting base, a torsion spring rod, means for securing an end of said torsion spring rod against turning movement with respect to said mounting base, a segmental gear associated with one of said pivotal supports, and means securing the other end of said torsion spring rod for limited turning movement with respect to said mounting base and including a second segmental gear arranged to cooperate with said first mentioned segmental gear for biasing said stationary member with respect to said driving connection.

5. A dynamo-electric machine or the like having a stationary member and a rotatable member provided with a driving connection adapted to exert a displacing force on said machine, means resiliently supporting said stationary member including pivotal supports therefor and utilizing said displacing force for varying the driving friction in said driving connection, a mounting base, a torsion spring rod having an end thereof secured against turning movement with respect to said mounting base, a segmental gear associated with one of said pivotal supports, and means securing the other end of said torsion spring rod for limited turning movement with respect to said mounting base and including a second segmental gear arranged to cooperate with said first mentioned segmental gear for biasing said stationary member with respect to said driving connection.

6. A dynamo-electric machine or the like having a stationary member and a rotatable member provided with a frictional driving connection adapted to exert a displacing force on said machine, means pivotally supporting said stationary member and utilizing said driving connection displacing force for varying the driving friction in said driving connection, said supporting means including a mounting base, a torsion spring rod having an end thereof secured against turning movement with respect to said mounting base, a segmental gear associated with said pivotal supporting means, means rotatably mounting the other end of said torsion spring rod on said mounting base and including a second segmental gear arranged to cooperate with said first mentioned segmental gear for biasing said stationary member with respect to said driving connection, and means including a plate for retaining said spring rod in position and for limiting the rotational movement of said rotatable torsion spring rod mounting.

7. A dynamo-electric machine or the like having a stationary member provided with hubs at each end thereof and a rotatable member provided with a frictional driving connection, resilient annuluses surrounding said hubs, supporting members having arcuate ends secured to said annuluses, pivotal supports for said supporting members eccentric with respect to the axis of said rotatable member, a mounting base for supporting said pivotal supports, a torsion spring rod having one end thereof secured against turning movement with respect to said mounting base, and means rotatably mounting the other end of said torsion spring rod on said mounting base and arranged to cooperate with one of said supporting members for biasing said stationary member with respect to said driving connection.

8. A mounting base for a dynamo-electric machine or the like having a frictional driving connection, means for pivotally supporting the machine on said mounting base, a segmental gear associated with said pivotal supporting means, a second segmental gear arranged to cooperate with said first mentioned segmental gear, and means connected to said second segmental gear for resiliently biasing the machine with respect to the driving connection.

9. A mounting base for a dynamo-electric machine or the like having a frictional driving connection, means for pivotally supporting the machine on said mounting base, a segmental gear associated with said pivotal supporting means, and means including a torsion spring rod arranged to cooperate with said segmental gear for biasing the machine with respect to the driving connection.

10. A mounting base for a dynamo-electric machine or the like having a frictional driving connection, means for pivotally supporting the machine on said mounting base, a segmental gear associated with said pivotal supporting means, a torsion spring rod, means for securing one end of said torsion spring rod against turning movement with respect to said mounting base, and means including a second segmental gear arranged to cooperate with said first mentioned segmental gear and to rotatably support the other end of said torsion spring rod on said mounting base for biasing the machine with respect to the driving connection.

EDWIN L. HORNING.